United States Patent [19]

Olschewski et al.

[11] 4,433,768

[45] Feb. 28, 1984

[54] CLUTCH THROW-OUT

[75] Inventors: Armin Olschewski, Schweinfurt; Manfred Brandenstein, Eussenheim; Lothar Walter; Heinrich Kunkel, both of Schweinfurt, all of Fed. Rep. of Germany

[73] Assignee: SKF Kugellagerfabriken GmbH, Schweinfurt, Fed. Rep. of Germany

[21] Appl. No.: 233,399

[22] Filed: Feb. 11, 1981

[30] Foreign Application Priority Data

Feb. 22, 1980 [DE] Fed. Rep. of Germany ....... 8004784

[51] Int. Cl.$^3$ ............................................ F16D 23/14
[52] U.S. Cl. .................................... 192/98; 192/110 B
[58] Field of Search ............... 192/98, 110 B; 308/233

[56] References Cited

U.S. PATENT DOCUMENTS

| 3,921,775 | 11/1975 | Matyschik | 308/233 X |
| 4,013,327 | 3/1977 | Kunkel et al. | 192/98 X |
| 4,026,398 | 5/1977 | Matyschik et al. | 308/233 X |
| 4,077,504 | 3/1978 | Ernst et al. | 192/98 |

Primary Examiner—Rodney H. Bonck
Attorney, Agent, or Firm—Daniel M. Rosen

[57] ABSTRACT

A clutch throw-out having a damping ring in the bore for centering and wherein motions of the clutch thrust bearing are softly dampened in a circumferential and radial direction.

6 Claims, 3 Drawing Figures

CLUTCH THROW-OUT

BACKGROUND OF THE INVENTION

The present invention relates to a clutch throw-out, and particularly to a motor-vehicle clutch having a sliding sleeve and a self-centering clutch thrust-bearing, which bearing abuts in a radially shiftable manner against a pressure plate of the sliding sleeve and which features in the bore or on the cylindrical surface of the stationary bearing ring an elastic ring for damping the bearing movements in a circumferential and in a radial direction.

DESCRIPTION OF THE PRIOR ART

It is known, in the case of clutch throw-outs, to arrange a damping ring in the bore of the stationary bearing ring. The damping ring dampens the relative motions of the clutch thrust-bearing in relation to the sliding sleeve. These known damping rings require a relatively large structural space in an axial direction, which makes specially designed bearing parts or housing parts necessary.

The object of the present invention is to provide clutch throw-out which is simple in construction and in which the damping ring requires only a relatively small structural space, in an axial direction.

BRIEF DESCRIPTION OF THE PRESENT INVENTION

In accordance with this invention, the damping ring is arranged in the bore or on the cylindrical surface of the stationary bearing ring, ensuring that the clutch thrust-bearing can center without difficulty and that the motions of the clutch thrust-bearing are softly dampened, in a circumferential and radial direction.

Further in accordance with this invention, projections are formed axially out of the pressure plate and which engage with substantial clearance in recesses of the outer ring. As a result, if there are large motions of the bearing in a circumferential direction, the lateral surfaces of the recesses hit against the projections and the spring-action tongues of the damping ring are not subject to damage.

According to a further characteristic of the invention, the damping ring is provided with a bore on the side facing the clutch. In the bore, a shroud plate is inserted in a manner such that it abuts on one side, with a relatively small clearance, against the damping ring, and on the other side against a snap ring that is located in an annular groove of the sliding sleeve. The shroud plate seals the space between the bearing rings and secures the clutch thrust-bearing against the sliding sleeve.

The invention will be setforth in greater detail in the following more detailed specification and appended drawings.

DETAILED DESCRIPTION OF THE PREFERRED EMBODIMENT

Figure 1:
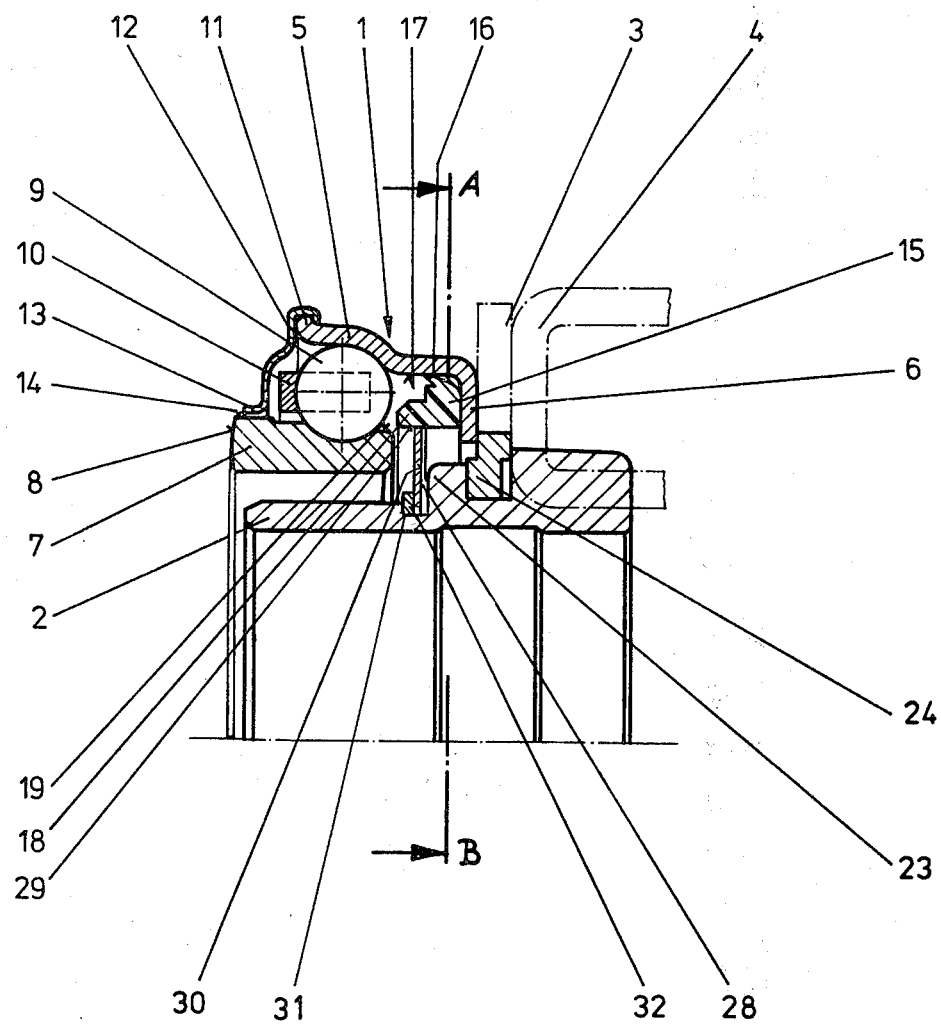
FIG. 1 shows a section of a clutch throw-out in accordance with the present invention.
Figure 2:
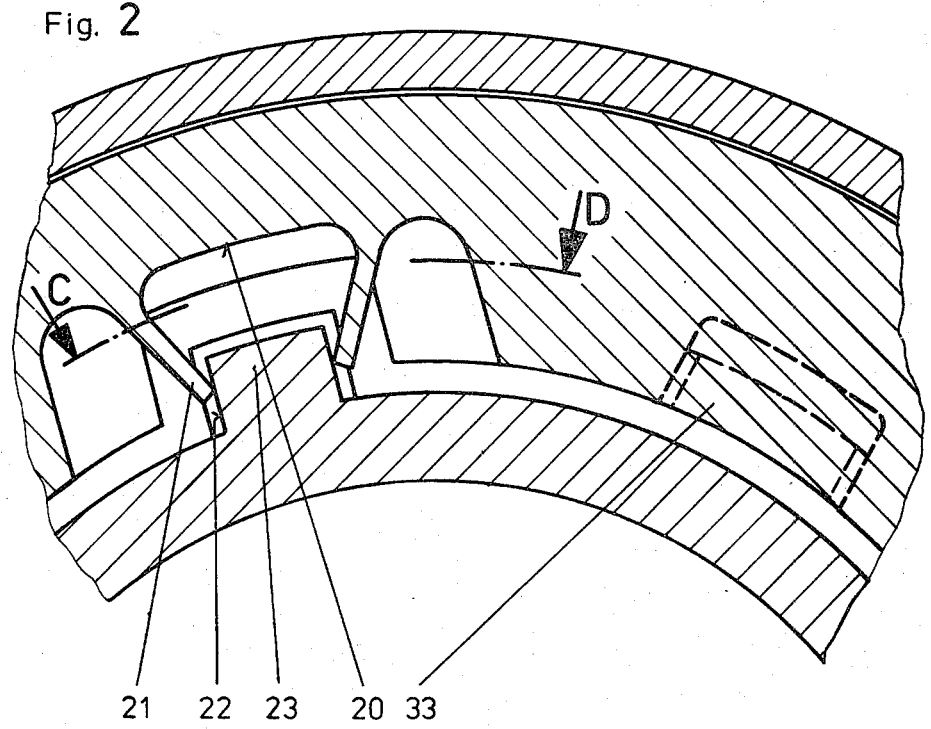
FIG. 2 is a partial section A—B of the clutch throw-out of FIG. 1.
Figure 3:
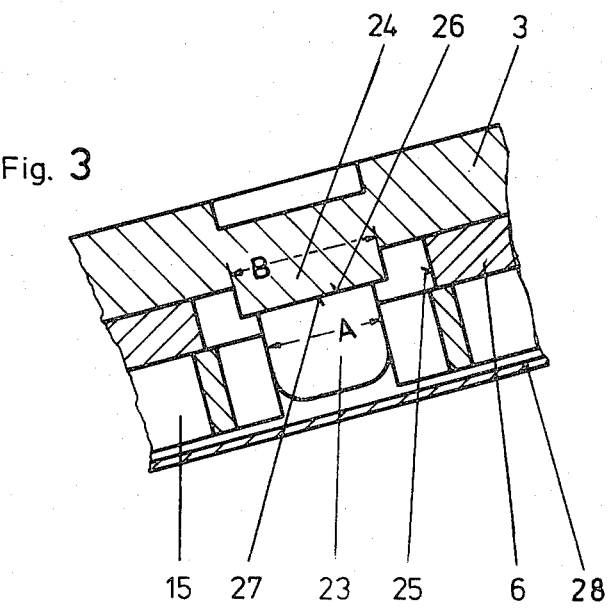
FIG. 3 shows a developed section C—D of the clutch throw-out of FIG. 2.

In FIGS. 1 to 3 there is represented a clutch throw-out which consists of a self-centering clutch thrust-bearing 1, a sliding sleeve 2 and a pressure plate 3 which is connected to the sliding sleeve. The actuating lever 4 of the clutch acts upon the pressure plate 3. The clutch thrust-bearing 1 includes an outer ring 5 formed out of sheetmetal. The outer ring 5 is extended in an axial direction on the side facing away from the clutch and features a flange 6 angled radially inward. The inner ring 7 of the clutch thrust-bearing 1 is made as an integral unit and is provided with a convex abutting surface 8 for cooperation with the diaphragm spring of the clutch, which spring is not shown. The balls 9, located in raceways between bearing rings 5, 7, are guided in a cage 10. A cover hood 12 is fixed to a rim 11 of outer ring 5, which rim is angled radially outward, into a corresponding section of the hood 12. The hood abuts, with a section 13 that is angled axially outward, with clearance, against the cylindrical surface 14 of inner ring 7. The flange 6 of outer ring 5, which flange is angled radially inward, is supported in an axial direction on pressure plate 3. Damping ring 15 which is located in outer ring 5, has at its cylindrical surface a rotary lip 16, the outer diameter of the lip is normally greater than the diameter of bore 17 in outer ring 5. When inserting damping ring 15 in bore 17 of outer ring 5, lip 16 is angled in the direction of the rolling-element set, in a manner such that no lubricant can emerge through the slot between outer ring 5 and damping ring 15. Furthermore, damping ring 15 is provided with an annular projection 18, which extends in close proximity toward the inner ring 7, so that the grease thrown off by rolling element 9 is directed back to the cylindrical surface 19 of inner ring 7.

Damping ring 15 includes a plurality of recesses in the bore. Preferably, four recesses 20 are distributed around the circumference. In each recess are provided two elastic tongues 21, shown in FIG. 2, that converge towards the center of the bearing. The elastic tongues 21 abut with clearance against the radially running lateral surfaces 22 of protrusions 23, which protrusions are made integral with sliding sleeve 2, in a manner such that motions of bearing 1 in a circumferential direction, such as during disengagement of the clutch, are dampened by elastic tongues 21. Due to a clearance between elastic tongues 21 and lateral surfaces 22 of protrusions 23, the radial motion of the bearing is not impeded, so that quick centering of clutch thrust-bearing 1 can be achieved. In order to prevent damage to tongues 21, in case of large motions of clutch bearing 1 in a circumferential direction, a projection 24 is provided. The projection 24 is formed axially out of pressure plate 3 and serves as an end stop, engaging with substantial clearance in a recess 25 of flange 6. Surfaces 26 of protrusions 23 abut against surfaces 27 of pressure plate 3, and fix the latter in an axial direction on sliding sleeve 2. Width A of protrusion 23, in a circumferential direction, is designed smaller than width B of projection 24 in a circumferential direction, so that flange 6 of outer ring 5 may not hit against protrusion 23 of sliding sleeve 2, which sleeve may be made of aluminum.

In order to axially fix clutch thrust-bearing 1 to pressure plate 3 of sliding sleeve 2, a shroud plate 28 is provided. The plate 28 is located in a bore 29 of damping ring 15. The plate 28 abuts, on one side, against surface 30 of damping ring 15, and, on the other side, against a snap ring 32 that is inserted in an annular groove 31 of sliding sleeve 2. Between shroud plate 28 and damping ring 15 there is a clearance, so that easy centering of clutch thrust-bearing 1 is possible, when the clutch is thrown out. In order to secure damping ring 15 against twisting in bore 17 of outer ring 5, at least one recess (not shown) is provided, e.g. in flange 6. This latter recess engages a projection 33 that is located on damping ring 15.

The invention is not confined to the example described. Within the framework of the invention concept, modifications, omissions, additions and substitutions will be apparent to those skilled in the art.

What is claimed is:

1. In a clutch throw-out, particularly for motor vehicle clutches, including a sliding sleeve and a self-centering clutch thrust-bearing having a bore, which thrust-bearing abuts in a radially shiftable manner against a pressure plate of the sliding sleeve, and having an elastic ring positioned with respect to said bore for damping the movements of said bearing in a circumferential direction, the improvement comprising providing said damping ring with a plurality of elastic tongues arranged in pairs and converging in an essentially radial direction, a plurality of protrusions arranged between said tongues and fixed with respect to said sliding sleeve, said tongues abutting with clearance against the lateral surfaces of said protrusions, a projection being formed out of said pressure plate and one of said radially directed protrusions lying against said projection with facing surfaces abutting, said projection being located with substantial clearance in a recess of said stationary bearing ring.

2. The clutch throw-out of claim 1, wherein the width, in a circumferential direction of said protrusion, is smaller than the width in a circumferential direction of each projection.

3. In a clutch throw-out, particularly for motor vehicle clutches, including a sliding sleeve and a self-centering clutch thrust-bearing having a bore, which thrust-bearing abuts in a radially shiftable manner against a pressure plate of the sliding sleeve, and having an elastic ring positioned with respect to said bore for damping the movements of said bearing in a circumferential direction, the improvement comprising providing said damping ring with a plurality of elastic tongues arranged in pairs and converging in an essentially radial direction, a plurality of protrusions arranged between said tongues and fixed with respect to said sliding sleeve, said tongues abutting with clearance against the lateral surfaces of said protrusions, said damping ring including a bore on the side facing said clutch, said bore having therein a shroud plate abutting on one side, with a clearance, the surface of said damping ring, and on the other side against a snap ring located in an annular groove of said sliding sleeve.

4. In a clutch throw-out, particularly for motor vehicle clutches, including a sliding sleeve and a self-centering clutch thrust-bearing having a bore, which thrust-bearing abuts in a radially shiftable manner against a pressure plate of the sliding sleeve, and having an elastic ring positioned with respect to said bore for damping the movements of said bearing in a circumferential direction, the improvement comprising providing said damping ring with a plurality of elastic tongues arranged in pairs and converging in an essentially radial direction, a plurality of protrusions arranged between said tongues and fixed with respect to said sliding sleeve, said tongues abutting with clearance against the lateral surfaces of said protrusions, the damping ring being arranged in the bore with at least four pairs of radially directed elastic tongues, a projection being formed out of said pressure plate and one of said radially directed protrusions lying against said projection with facing surfaces abutting, said projection being located with substantial clearance in a recess of said stationary bearing ring.

5. The clutch throw-out of claim 4, wherein the width, in a circumferential direction of said protrusion is smaller than the width in the circumferential direciton of each projection.

6. In a clutch throw-out, particularly for motor vehicle clutches, including a sliding sleeve and a self-centering clutch thrust-bearing having a bore, which thrust-bearing abuts in a radially shiftable manner against a pressure plate of the sliding sleeve, and having an elastic ring positioned with respect to said bore for damping the movements of said bearing in a circumferential direction, the improvement comprising providing said damping ring with a plurality of elastic tongues arranged in pairs and converging in an essentially radial direction, a plurality of protrusions arranged between said tongues and fixed with respect to said sliding sleeve, said tongues abutting with clearance against the lateral surfaces of said protrusions, the damping ring being arranged in the bore with at least four pairs of radially directed elastic tongues, said damping ring including a bore on the side facing said clutch, said bore having therein a shroud plate with one side thereof abutting the surface of said damping ring with clearance, the other side of said shroud abutting a snap ring located in an annular groove of said sliding sleeve.

* * * * *